J. Manchester.
Animal-Trap.
№ 74105. Patented Feb. 4, 1868.
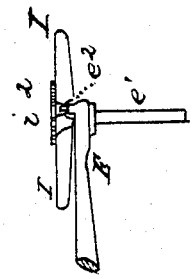
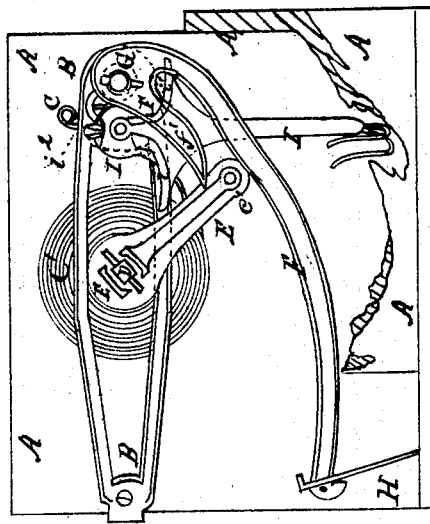
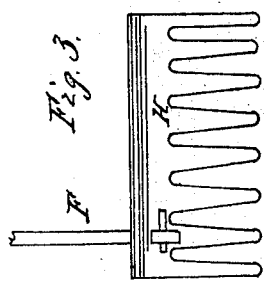
Witnesses.
Theo Tusche.
W. Trewrn.
Inventor.
J. Manchester
Per Munn &
Attorneys

United States Patent Office.

JOEL MANCHESTER, OF NEW YORK, N. Y.

Letters Patent No. 74,105, dated February 4, 1868.

IMPROVED ANIMAL-TRAP.

*The Schedule referred to in these Letters Patent and making part of the same.*

TO ALL WHOM IT MAY CONCERN:

Be it known that I, JOEL MANCHESTER, of the city, county, and State of New York, have invented a new and useful Improvement in Animal-Traps; and I do hereby declare that the following is a full, clear, and exact description thereof, which will enable others skilled in the art to make and use the same, reference being had to the accompanying drawings, forming a part of this specification, in which—

Figure 1 is a side view of my improved trap, part of the box being broken away to show the construction.

Figure 2 is a detail view, showing the device for setting the trap.

Figure 3 is a detail view of the toothed plate, by which the animal is killed.

Similar letters of reference indicate corresponding parts.

My invention has for its object to furnish a simple, cheap, and effective trap, by means of which animals may be killed and thrown from the trap, the trap setting itself for the next animal; and it consists in the construction, combination, and arrangement of the various parts of the machine, as hereinafter more fully described.

A is the box of the trap, the upper part and front side of which may be left open, as shown in fig. 1. B is a frame, securely attached to the sides of the trap to confine the spring or springs C in place, and furnish a support for the other parts of the mechanism. The spring C is coiled around, and has one of its ends attached to the shaft D, that passes through and works in a bearing formed in the centre of the frame B. The other end of the spring C is attached to one end of the frame B, or to some other support. To the end of the shaft D is attached a crank-lever, E, from the other end of which projects a pin or arm, $e^1$. F is a lever, one end of which is pivoted to a pin, G, attached to the end of the frame B, and to the other end of which is attached a plate, H, having one or more downwardly-projecting teeth, as shown in fig. 3. The lever F is made in substantially the form shown in fig. 1, has a short arm, $f'$, formed upon its upper side near its pivoted end, and its bearing upon the pin G is made long, so that it may always move up and down vertically. I is a pivoted plate or bar, to the lower end of which the bait-hook is attached. The upper part of the plate I is made in substantially the form shown in fig. 1, that is to say, with curved guide-flanges $i^1$, upon its outer sides, against which the projections $e^2$, formed upon the end of the crank-lever E, as it revolves, strikes so as to bring the projection $i^2$, formed upon the upper end of the plate I, above its pivoting-point, into proper position for the said projection $e^2$ to strike against to hold the trap set. The spring C is wound up by removing the arm or lever F, and turning the crank-lever E. When the trap is set, the projection $e^2$, of the crank-lever E, rests against the projection $i^3$ of the plate or bar I, holding the arm or lever F, and toothed plate H raised above the box.

As the animal nibbles the bait, he moves the pivoted arm or plate I, releasing the crank-lever E from the plate I, when the spring C revolves the crank-lever E. The first effect is that the pin $e^1$, pressing against the lower end of the arm $f$, raises the lever F into nearly a vertical position. It then presses against the upper edge of the main part of the lever F, forcing it down, and forcing the teeth of the plate H through the animal, killing him, the pin $e^1$, owing to the peculiar form of the lever F, continually pressing against the upper edge of the said lever F, until the crank-lever E has reached the position shown in fig. 1. From this point, until the projection $e^2$ catches upon the projection $i^2$, the pin $e^1$ presses against the lower side of the arm $f'$, raising the lever F and toothed plate H, throwing the dead animal off the teeth of the plate H out of the way, leaving the trap set for the next animal.

Having thus described my invention, what I claim as new, and desire to secure by Letters Patent, is—

1. The arm or lever F, constructed substantially in the shape and manner herein shown and described, in combination with the toothed plate H, crank-lever E, and spring C, substantially as and for the purpose set forth.

2. The pivoted bait-hook bar or plate I, constructed substantially as herein shown and described, in combination with the crank-lever E, as and for the purposes set forth.

The above specification of my invention signed by me, this 24th day of September, 1867.

JOEL MANCHESTER.

Witnesses:
WM. F. McNAMARA,
JAMES T. GRAHAM.